United States Patent [19]
Sletten et al.

[11] 3,725,917
[45] Apr. 3, 1973

[54] RADAR PHASE COMPARISON METHOD AND SYSTEM FOR OBJECT RECOGNITION

[75] Inventors: Carlyle J. Sletten, Acton; Allan C. Schell, Richard B. Mack, William B. Goggins, Jr., all of Winchester; Philipp Blacksmith, Concord, all of Mass.

[73] Assignee: The United States of America as represented by the Secretary of the Air Force

[22] Filed: Jan. 27, 1969

[21] Appl. No.: 795,775

[52] U.S. Cl............343/55 A, 343/5 CD, 343/17.2 R, 343/17.5
[51] Int. Cl.................................................G01s 9/02
[58] Field of Search......343/5, 18 B, 17.1, 17.2, 17.5

[56] References Cited

UNITED STATES PATENTS

| 3,157,875 | 11/1964 | Matsukasa et al. | 343/17.1 X |
| 3,374,478 | 3/1968 | Blau | 343/5 |
| 3,397,398 | 8/1968 | Dutton et al. | 343/17.2 X |
| 3,478,354 | 11/1969 | Foster et al. | 343/5 |

Primary Examiner—Malcolm F. Hubler
Attorney—Harry A. Herbert, Jr. and George Fine

[57] ABSTRACT

A radar method and system of object recognition wherein multiple integral coherent-harmonic frequency signals are directed towards the object and the return signals therefrom are phase compared to provide a resultant signal having characteristics distinguishing the object from its background. Also included is a color display for displaying the resultant signal in color to enhance the reflection characteristics of the object.

3 Claims, 3 Drawing Figures

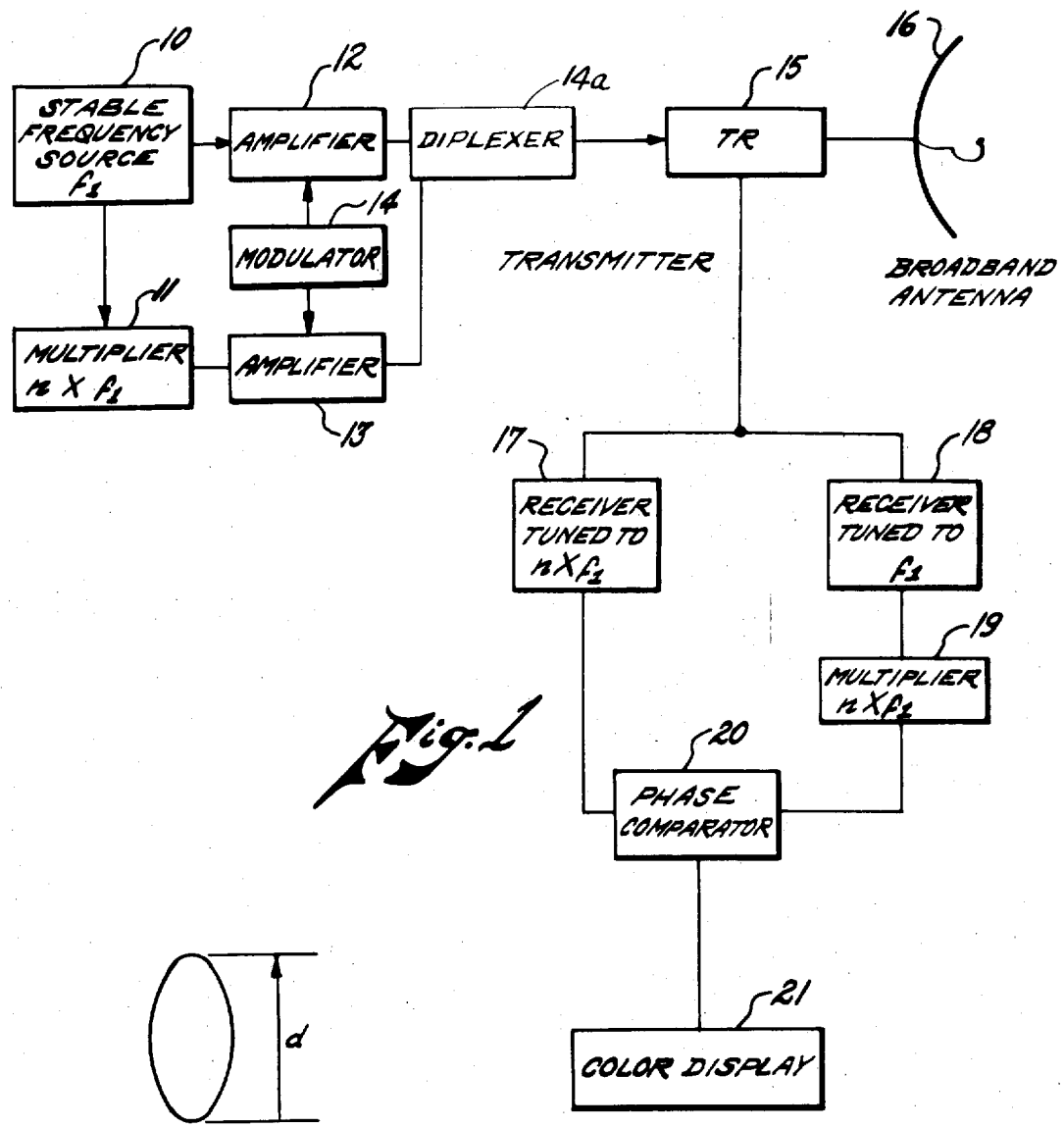

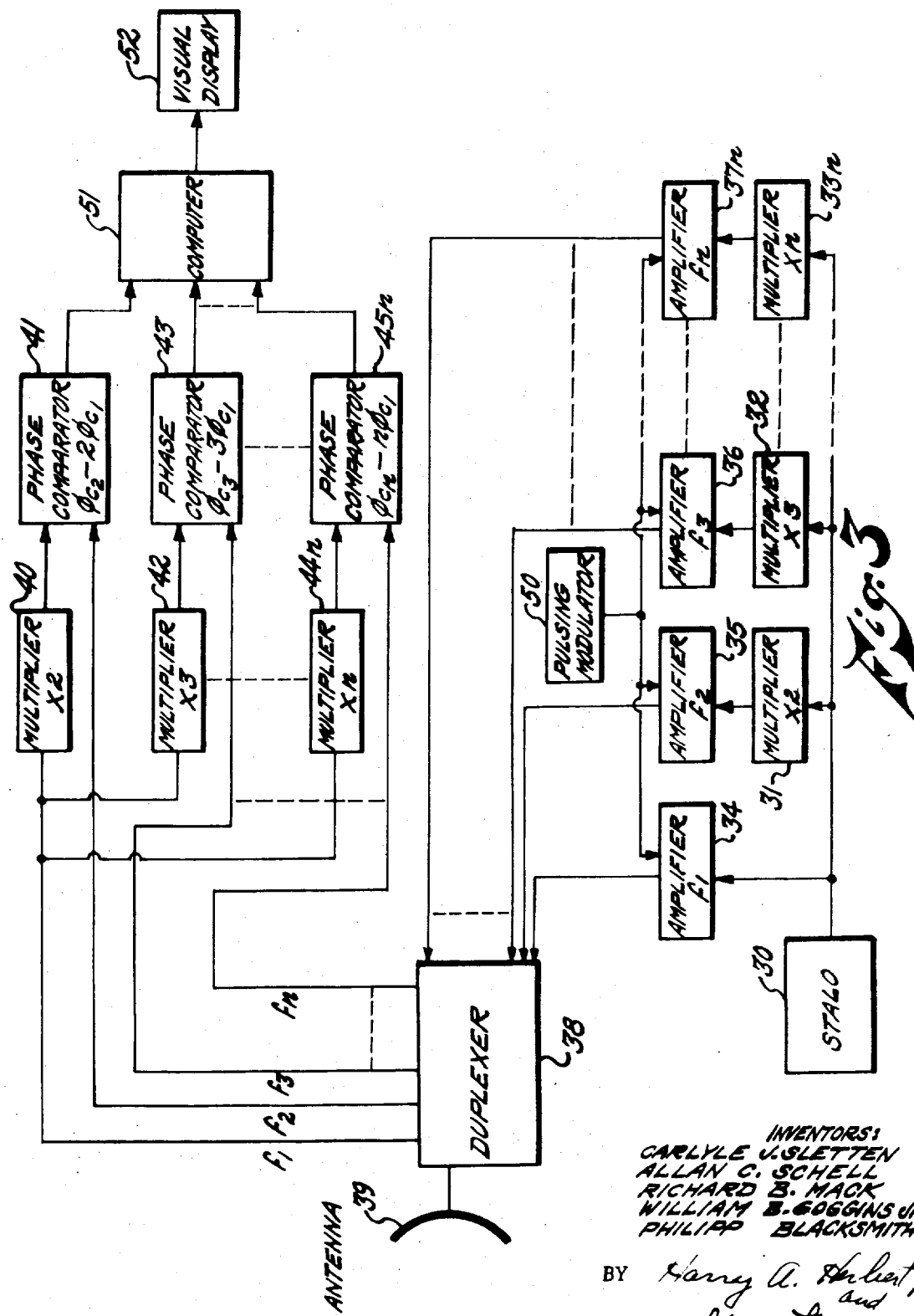

RADAR PHASE COMPARISON METHOD AND SYSTEM FOR OBJECT RECOGNITION

CROSS-REFERENCE TO RELATED PATENTS

Filed at even-date herewith is the U.S. patent application Ser. No. 795,776 entitled "A Radar Non-Integral Radar Phase Comparison System For Object Recognition" by Carlyle J. Sletten, Philipp Blacksmith and William B. Goggins, Jr., in which is described a phase comparison radar system of object recognition wherein non-integral coherent-harmonic signals are transmitted towards the object of interest and return signals therefrom are phase compared to provide resultant signals having characteristics to distinguish the object. In addition thereto and also filed at even-date herewith is the U.S. patent application Ser. No. 795,777 "A Radar Phase Comparison System Including A Superheterodyne Receiver" by Carlyle J. Sletten, Philipp Blacksmith, and William B. Goggins, Jr., in which multiple coherent harmonic signals are transmitted toward an object and the return signals therefrom are processed by a superheterodyne apparatus for subsequent phase comparison purposes to provide a resultant signal having characteristics distinguishing the object.

BACKGROUND OF THE INVENTION

There has been developed in the past phase comparison as a method of radar angle determination on two-port antennas. The 3-D Height Finder System as disclosed by W. G. Mavroides, L. G. Dennett, and L. S. Dorr entitled "3-D Based on Phase-in-Space Principle" in IEEE Trans. on Aerospace and Electronics Systems, Vol. AES-2, No. 3, May 1966, uses a focusing reflector antenna and an extended line source feed with terminals at each end to measure angles within wide search beams. The same principles are being used with two identical low gain antennas operating with a H.F. radar such as disclosed by C. J. Sletten, P. Blacksmith, and C. E. Ellis in "Resonant-Region, Phase Comparison Radar for Detection of Objects in Clutter" in the Proceedings of First Counterinsurgency Research and Development Symposium, held at Institute for Defense Analyses, Arlington, Virginia, 14-16 June 1966.

The present invention provides another radar method and system of phase comparison which distinguishes certain features of single or multiple targets. The radar of the present invention makes use of the difference in the phase of radar scattering coefficients at two frequencies.

The currents and driving E-fields (or voltages) on a metal object in free space have time phase relations which are dependent on object size and configuration. When an object about $\lambda/2$ long is illuminated by a plane wave it acts very much like an antiresonant circuit which has a rapid change of phase between current and voltage as frequency is varied. In free space, the object is radiating and thus provides a resistive damping term which tends to broaden or flatten the sharp resonant curve one might measure for a tank circuit composed of L–C elements, for example. Thick objects such as rods or curved forms have even broader characteristics. However, characteristic phase shifts do occur for metal objects near resonant dimensions which, when properly instrumented, can be used to distinguish them from echoes from trees, soil, rocks and other lossy scatterers. Large dielectric or metal structures have different characteristic phase vs. frequency responses.

As the scattering from objects is directly related to the currents on the objects the phase between the incident plane wave and the back scattered wave is a measure of the circuit type of current voltage relations in familiar network theory mentioned. One method to find this phase shift at a single frequency is to measure the voltage standing wave ratio in the vicinity of the object. This is impractical at a remote radar site when the distance to the target is not precisely known.

The phase phenomena may be measured by a new technique which is independent of the range to the target and at the same time obtain a gauge of the phase shift as a function of frequency by the use of two coherent harmonically related signals.

SUMMARY OF THE INVENTION

The present invention provides a radar method and system of object recognition wherein a pair of coherent harmonically related signals are directed toward the object and the return signals therefrom are phase compared to provide a resultant signal having characteristics distinguishing the object from its background. Also included are means for displaying the resultant signal in color to enhance the reflection characteristics of the object. The radar of the present invention recognizes scattering objects by the characteristic phase shifts of the scattered signals. This information is separated from other phase shifts due to distance to target, angle of arrival, motion of target, and other causes by the use of two transmitted and received frequencies which are in coherent harmonic relation to each other. By suitable processing and phase comparison of reflected signals received at both frequencies simultaneously, phase information characteristics of the targets are measured and displayed. In particular, metal objects are distinguished from lossy objects such as trees or from lossy earth and water surfaces, particularly when the metal targets have dimensions approximately the same as half wavelengths of one of the two transmitted frequencies.

The use of phase reflection coefficients of radar targets as a means of recognizing them and the means for measuring the phase characteristics invariant and undisturbed by other phase changes is one of the uniquely important features of this invention. In addition thereto, the phase information obtained with this method and system is utilized in a color display, as in television, to present the unique reflection characteristics of the targets to the radar observer.

It is emphasized the radar of the present invention allows recognition of resonant metal targets in a background of natural reflections from earth and vegetation. The radar also makes possible direct measurement of the maximum dimensions of aircraft or other metal objects by suitable choice of harmonic frequencies and further permits direct instrumentation in terms of color television technology facilitating quick identification and counter-action by airborne or ground radar operators having this equipment. It is noted also that the present radar may be utilized in reconnaissance-strike operations seeking trucks, tanks, missile sites on the earth's surface, and for attacking low flying aircraft by detecting them against terrain background. It is also useful for the identification (IFF) of aircraft by measuring the maximum dimensions.

An object of the present invention is to provide a radar method and system which recognizes scattering objects by the characteristic phase shifts of the scattered signal.

Another object of the present invention is to provide a radar method and system for utilizing the phase reflection coefficients of radar targets as a means of recognition.

Still another object of the present invention is to provide a radar method and system for utilizing the phase reflection coefficients of radar targets for recognition purposes wherein the measured phase characteristic of the radar targets are invariant and undisturbed by other phase changes.

Yet another object of the present invention is to provide a radar method and system to distinguish certain features of single and multiple targets by the use of the difference in the phase of radar scattering coefficients at two harmonically related frequencies.

The various features of novelty which characterize this invention are pointed out with particularity in the claims annexed to and forming a part of this specification. For a better understanding of this invention, its advantages and specific objects obtained with its use, reference should be had to the accompanying drawings and descriptive matter in which is illustrated and described a preferred embodiment of the invention.

BRIEF DESCRIPTION OF THE DRAWINGS

In the drawings:

FIG. 1 shows a block diagram of the preferred embodiment of the invention;

FIG. 2 illustrates one possible configuration of a radar target; and

FIG. 3 shows a second embodiment.

DESCRIPTION OF THE PREFERRED EMBODIMENT

Now referring to FIG. 1, there is shown stabilized oscillator 10, generating a signal having a preselected frequency, $f_1$. Oscillator 10 might be similar to the type of stabilized oscillator known as STALO or may be a radar type oscillator having a high degree of frequency stability. The output signal, $f_1$, of oscillator 10 is fed simultaneously to amplifier 12 and multiplier 11, Multiplier 11 is designed to multiply the signal frequency, $f_1$, by a constant, $n$. In general, $n$ will be 2 or 3 in order to compare target phase in resonant region with Rayleigh region or second or third object resonant scattering as indicated in the following example:

$$\text{for } f_1, e \doteq \lambda 1/2$$

$d$ being the dimension of radar target 30 as shown in FIG. 2 and for $f_2 = 3f_1, d \doteq 3\lambda 2/2$

Then $d \doteq \lambda 1/6$ or Rayleigh scattering.

It is obvious that the wavelengths will be selected to find the object of interest, assuming their sizes are roughly known. The radar may be pulsed or cw (continuous wave). The targets are not very dispersive and at lower frequencies (not in the ionosphere) the propagation media is not dispersive either.

The output of multiplier 11 which is harmonically related to the signal frequency $f_1$ is fed to the amplifier 13. The output signals from amplifier 12 are $f_1$ and from amplifier 13, $nxf_1$. The amplifiers are simultaneously keyed by conventional radar modulator 14 which may be a conventional radar pulser. The outputs from both amplifiers 12 and 13 are fed to broadband antenna 16 by way of diplexer 14a conventionally utilized in the art for two signals and conventional transmit receive switch 15. Antenna 16 directs pulsed radar signals toward the target of interest. The pulsed radar signals are comprised of a pair of preselected coherent harmonically related frequencies.

The return echoes from the target of interest are received by antenna 16 and pass through transmit receive switch 15 and are fed simultaneously to receivers 17 and 18. Receiver 17 is tuned to a frequency of $nxf_1$ and receiver 18 to $f_1$. The output of receiver 18 is fed to multiplier 19 which multiplies by the aforementioned $n$, thus the output from multiplier 19 is $nxf_1$. The output, $f_1$, of receiver 17 and the output, $nxf_1$, of multiplier 19 are fed to phase comparator 20 and the phase difference is then applied to color display 21 which may be such as utilized in a color cathode tube television display.

For a narrow beam search radar scanning a surface for metal objects against a wooded background, a PPI display could convert the phase difference between incoming targets to color on the oscilloscope screen as is done in television by phase comparison.

Thus there is provided a unique method and system of phase comparison to distinguish certain features of single or multiple targets by utilizing the difference in the phase of radar scattering coefficients at two harmonically related frequencies. It is emphasized that scattering objects such as radar targets are recognized by the characteristic phase shifts of the scattered signals. This information is separated from other phase shifts due to distance to the target, angle of arrival, motion of the target, and other causes by the use of two transmitted and received frequencies which are in coherent harmonic relation to each other. By suitable processing and phase comparison of reflected signals received at both frequencies simultaneously, phase information characteristics of the targets is measured and displayed. In particular, metal targets are distinguished from returns from lossy objects such as trees or from lossy earth and water surfaces, particularly when the metal targets have dimensions approximately the same as half wavelengths of one of the two transmitted frequencies. It is also noted the instrumentation of the phase information using color display as in television to present characteristics of the targets to the radar observer is unique when the phase information is derived from the reflection characteristics of the targets. It is further noted that the present method and system allows direct measurement of the maximum dimensions of aircraft or other metal objects by suitable choice of harmonic frequencies.

The color display system may be comprised of a conventional range-azimuth indicator (RAI) especially modified for color on which target range is displayed on one axis, target azimuth on the other axis, and target strength as brightness. The difference would be that the phase comparator output which is a voltage proportional to the phase difference between the two frequencies would be displayed as color on the face of the CRT. Any color cathode ray tube system on which the color can be controlled could be used to accomplish this.

It is noted that the invention is not limited to a two-frequency system, however the frequencies are integral multipliers of one another and are coherently synthesized by the same stable source. There are several possible embodiments of systems having more than two frequencies. One embodiment is shown in FIG. 3. The original signal having the basic frequency $f_1$ is generated in STALO 30. The original signal having basic frequency $f_1$ is multiplied by $2, 3 \ldots, n$ in multipliers 31, 32 . . . , 33 $n$, respectively. The original signal is passed through power amplifier 34, and each of the multiplied signals from multipliers 31, 32, . . . , 33 $n$ are passed through each of power amplifiers 35, 36, . . . , 37 $n$, respectively, so that the output of amplifiers 34, 35, 36, . . . 37$n$ are signals having the frequencies $f_1, f_2, f_3, \ldots, f_n$ respectively. It is noted amplifiers 34, 35, 36 . . . , 37 n are pulsed by common modulator 50. The amplified signals go through $n$ channel duplexer 38 to antenna 39 from which they are directed towards the target of interest. The echo signals from the target of interest are received by antenna 39. The received signals are separated by duplexer 38 from the transmitted signals. The received signal having frequency $f_1$ is multiplied by 2 in multiplier 40 and then compared in phase with the received signal having the frequency $f_2$ by phase comparator 41. The received signal having frequency $f_1$ is also multiplied by 3 in multiplier 42 and then compared in phase with the received signal having frequency $f_3$ by phase comparator 43. This process is carried out for all signals having frequencies up to $f_n$ utilizing multipliers up to $44_n$ and phase comparators up to $45_n$. The phases of the target reflections are $\phi_{c1}$ at frequency $f_1$, $\phi_{c2}$ at frequency $f_2$, $\phi_{c3}$ at frequency $f_3$ and $\phi_{cn}$ at frequency $f_n$.

The outputs of the phase comparators are fed to conventional type computer 51 in which previously there has been stored sets of information, each set being representative of a particular type of return signals from targets of interest previously measured. The aforesaid outputs of the phase comparators are matched in the computer against each set of stored information and when they coincide with any stored set, an output signal from the computer will so indicate. The output signal from computer 51 is then received by visual display 52 which may be similar to display 21 of FIG. 1.

While in accordance with the provisions of the statutes, we have illustrated and described the best form of the invention now known to us, it will be apparent to those skilled in the art that changes may be made in the form of the system disclosed without departing from the spirit of the invention as set forth in the appended claims, and that in some cases certain features of the invention may be used to advantage without a corresponding use of other features.

Having now described our invention, what we claim as new and desire to secure Letters Patent is:

1. A radar system of recognizing signal scattering targets such as aircraft by the characteristic phase shifts of the scattered signals therefrom comprising stable means to generate a signal of preselected frequency, said preselected frequency being directly related to the size of said signal scattering targets, first means to multiply the frequency of said generated signal by a preselected constant to provide a second signal harmonically related to said generated signal, means to amplify said generated signal and said second signal to provide high power output therefrom, modulating means to key said amplifiers, means to transmit the output from said amplifying means towards said signal scattering targets, means to receive said scattered signals from said signal scattering targets, means to separate said received signals into a pair of signals representative of said generated signals and said second signals, second means to multiply the frequency of said separated signal representative of said generated signal by said preselected constant, and means to phase compare said separated signal representative of said second signal and the second multiplied signal to each other to provide a resultant signal representative of said signal scattering targets.

2. A radar system as described in claim 1 further including first and second means to amplify said generated and said second signals, respectively, before being received by said modulating means.

3. A radar system as described in claim 1 wherein said modulator means is comprised of a pulser.

* * * * *